(12) United States Patent
Kusumoto et al.

(10) Patent No.: US 6,946,223 B2
(45) Date of Patent: Sep. 20, 2005

(54) NEGATIVE ELECTRODE FOR LITHIUM SECONDARY BATTERY AND LITHIUM SECONDARY BATTERY

(75) Inventors: Yasuyuki Kusumoto, Kobe (JP); Atsushi Fukui, Nara (JP); Hiroshi Nakamura, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 320 days.

(21) Appl. No.: 10/329,571

(22) Filed: Dec. 27, 2002

(65) Prior Publication Data

US 2003/0148185 A1 Aug. 7, 2003

(30) Foreign Application Priority Data

Dec. 28, 2001 (JP) ......................................... 2001-401286

(51) Int. Cl.[7] .............................. H01M 4/66; H01M 4/58
(52) U.S. Cl. ................. 429/245; 429/231.95; 429/231.8
(58) Field of Search .................................. 429/233, 245, 429/231.95, 231.8

(56) References Cited

FOREIGN PATENT DOCUMENTS

| JP | 8-50922 | 2/1996 |
|---|---|---|
| JP | 11-339777 | 12/1999 |
| JP | 2000-012088 | 1/2000 |
| JP | 2000-268824 | 9/2000 |
| JP | 2001-210323 | 8/2001 |

*Primary Examiner*—Patrick Joseph Ryan
*Assistant Examiner*—Thomas H. Parsons
(74) *Attorney, Agent, or Firm*—Westerman, Hattori, Daniels & Adrian, LLP

(57) ABSTRACT

A negative electrode for lithium secondary battery includes a negative electrode collector having a proportional limit of not less than 2.0 N/mm and having a negative electrode material attached thereon, and the negative electrode material including a material to be alloyed with lithium.

15 Claims, 4 Drawing Sheets

(A)

(B)

NEGATIVE ELECTRODE FOR LITHIUM SECONDARY BATTERY AND LITHIUM SECONDARY BATTERY

BACKGROUND OF THE INVENTION

1. Field of the Invention

The present invention relates to a negative electrode for lithium secondary battery which comprises a negative electrode material and a negative electrode collector having the negative electrode material attached to a surface thereof, and to a lithium secondary battery employing such a negative electrode.

2. Description of the Related Art

As one type of the new secondary batteries featuring high powers and high energy densities, a lithium secondary battery is in wide use, which employs a non-aqueous electrolyte and which is adapted for charge/discharge by way of transfer of lithium ions between a positive electrode and a negative electrode.

In such a lithium secondary battery, the negative electrode comprises a negative electrode material including a material to be alloyed with lithium, and a negative electrode collector having the negative electrode material attached thereon.

However, in a case where the negative electrode material includes the material to be alloyed with lithium, the charging/discharging processes involve substantial expansion/contraction of the material to be alloyed with lithium. Hence, with repeated charging/discharging processes, the negative electrode is gradually deformed. A thin lithium secondary battery such as of a card type encounters a problem of increase in the thickness thereof.

More recently, the above lithium secondary batteries have come into use as a power source for a variety of portable devices. This leads to a demand for a lithium secondary battery having an even higher energy density.

In this connection, there has been proposed a lithium secondary battery, such as disclosed in Japanese Patent Publication No. 2948205, which comprises a negative electrode fabricated as follows. A composite powder material containing silicon or a silicon-carbon composite material, having a high capacity density, is used as the negative electrode material. A slurry containing the negative electrode material and a binder resin is applied to the negative electrode collector of a metal foil, which is sintered in a non-oxidizing atmosphere to form the negative electrode.

Unfortunately, if a negative electrode collector of a metal foil having a smooth surface is processed by the method wherein the slurry containing the negative electrode material and binder resin is applied to the negative electrode collector and sintered in the non-oxidizing atmosphere, the following problem results. That is, the negative electrode collector of the smooth surface has such a small contact area with the negative electrode material that the sintering process cannot achieve a significant increase in the adhesion between the negative electrode collector and the negative electrode material. As a result of the expansion or contraction of the negative electrode material in association with the charging/discharging processes, contact between the negative electrode material and the negative electrode collector is decreased. Thus, resistance between the negative electrode material and the negative electrode collector is increased so that a battery is decreased in charge/discharge cycle performance.

SUMMARY OF THE INVENTION

The invention is directed to a solution to the above problems associated with the negative electrode for lithium secondary battery which comprises the negative electrode material and the negative electrode collector having the negative electrode material attached to its surface, and with the lithium secondary battery employing such a negative electrode.

A first object of the invention is to prevent the deformation of the negative electrode associated with repeated charging/discharging processes carried out in the lithium secondary battery comprising the negative electrode which includes the negative electrode collector with the negative electrode material attached thereon, thereby suppressing the increase of thickness of a thin lithium secondary battery such as of a card type.

A second object of the invention is to achieve an excellent charge/discharge cycle performance by suppressing the decrease of contact between the negative electrode material and the negative electrode collector resulting from the charging/discharging processes.

According to a first aspect of the invention, a negative electrode for lithium secondary battery comprises a negative electrode material including a material to be alloyed with lithium, and a negative electrode collector having the negative electrode material attached thereon, wherein the negative electrode collector has a proportional limit of not less than 2.0 N/mm. The proportional limit means a value determined according to the Japanese Industrial Standards JIS Z 2241-1995.

If the negative electrode collector having a proportional limit of not less than 2.0 N/mm is employed as suggested by the negative electrode for lithium secondary battery of the first aspect hereof, the negative electrode collector is capable of returning to its original state through elastic deformation in conjunction with the substantial expansion or contraction of the negative electrode material caused by the charging or discharging process. Accordingly, the negative electrode is decreased in deformation when subjected to repeated charging/discharging processes. Even a thin lithium secondary battery, such as of a card type, suffers less increase in the thickness thereof.

In the negative electrode for lithium secondary battery of the first aspect hereof, examples of a usable material for the negative electrode collector include metals such as copper, nickel, iron, titanium, cobalt and the like, and alloys thereof. In particular, the negative electrode may preferably employ a negative electrode collector formed of a material containing a metal element prone to be diffused in the negative electrode material in order to achieve an increased adhesion between the negative electrode collector and the negative electrode material. More preferably, a negative electrode collector formed of copper or a copper alloy may be employed.

To achieve an increased adhesion with the negative electrode material, the negative electrode collector may preferably have an arithmetic mean surface roughness Ra of not less than 0.2 μm, or more preferably of not less than 0.5 μm.

According to a second aspect of the invention, a negative electrode for lithium secondary battery comprises a negative electrode composite including a negative electrode material containing silicon, a conductive carbon material and a binder resin, and a negative electrode collector having the negative electrode composite attached to a surface thereof and sintered in a non-oxidizing atmosphere to form thereon a layer of the negative electrode composite, wherein the negative electrode collector has an arithmetic mean roughness Ra of not less than 0.2 μm at the surface formed with the negative electrode composite layer, wherein the arithmetic mean surface roughness Ra of the negative electrode collector and a thickness X(μm) of the negative electrode composite layer satisfy a condition of 250≧X/Ra, wherein the negative electrode composite layer contains therein the conductive carbon material in concentrations of 0.5 to 30 wt % and the binder resin in concentrations of 5 to 40 wt %.

The negative electrode for lithium secondary battery of the second aspect hereof employs the negative electrode material containing silicon having a great capacity density and hence, a lithium secondary battery having a high energy density can be obtained.

The negative electrode for lithium secondary battery of the second aspect hereof employs the negative electrode collector having an arithmetic mean roughness of not less than 0.2 μm at its surface formed with the negative electrode composite layer and hence, a contact area between the negative electrode material and the negative electrode collector is so increased as to allow the sintering process to achieve a notable increase of the adhesion between the negative electrode collector and the negative electrode material. Accordingly, the negative electrode collector is capable of retaining the negative electrode material in an adequate contact therewith despite the expansion or contraction of the negative electrode material associated with the charging or discharging process. This contributes to the suppression of increase in resistance between the negative electrode material and the negative electrode collector and thence, to the improvement of the charge/discharge cycle performance of the lithium secondary battery.

It is noted that the thickness of the negative electrode collector is not particularly limited. However, if the negative electrode collector has an excessive thickness, the negative electrode cannot attain a sufficient capacity because of a decreased proportion of the negative electrode material. Thus, the negative electrode collector may preferably have a thickness of not more than 1000 μm. Conversely, if the negative electrode collector is too small in thickness, the negative electrode will suffer deformation associated with the charging/discharging processes because the negative electrode collector is decreased in strength. Hence, the negative electrode collector may preferably have a thickness in the range of 5 μm to 100 μm.

It is preferred that the arithmetic mean surface roughness Ra of the negative electrode collector and a mean spacing S between profile peaks on the surface thereof satisfy a condition of 100 Ra≧S. It is noted that the arithmetic mean surface roughness Ra and the mean spacing S between profile peaks are values specified by the Japanese Industrial Standards (JIS B 0601-1994) and may be measured using a roughness tester.

In the negative electrode for lithium secondary battery of the second aspect hereof, examples of a usable material for the negative electrode collector include metals such as copper, nickel, iron, titanium, cobalt and the like, and alloys thereof. In particular, the negative electrode may preferably employ a negative electrode collector formed of a material containing a metal element prone to be diffused in the negative electrode material in order to achieve an increased adhesion between the negative electrode collector and the negative electrode material. More preferably, a negative electrode collector formed of copper or a copper alloy may be employed.

The negative electrode collector at least a surface of which is formed of copper or copper alloy and which has an arithmetic mean surface roughness Ra of not less than 0.2 μm may include, for example, a metal foil of copper, nickel or the like, on a surface of which copper is electrolytically deposited.

In the negative electrode for lithium secondary battery of the second aspect hereof, the arithmetic mean surface roughness Ra of the negative electrode collector and the thickness X(μm) of the negative electrode composite layer formed on the surface of the negative electrode collector by sintering satisfy the condition of 250≧X/Ra. This results in an even more increased adhesion between the negative electrode collector and the negative electrode material. Specifically, if the value of X/Ra exceeds 250 because of an increased thickness X of the negative electrode composite layer, the charging/discharging processes encounter an increased degree of expansion/contraction of the negative electrode composite, resulting in a decreased adhesion between the negative electrode collector and the negative electrode material.

In the negative electrode for lithium secondary battery of the second aspect hereof, the negative electrode composite layer formed on the surface of the negative electrode collector by sintering contains therein the conductive carbon material in concentrations of 0.5 to 30 wt % and the binder resin in concentrations of 5 to 40 wt %.

The amount of the conductive carbon material present in the negative electrode composite layer is limited to the range of 0.5 to 30 wt % for the following reasons. If the amount of the conductive carbon material is less than 0.5 wt %, the negative electrode is decreased in current collecting performance, leading to a decreased charge/discharge performance. If, on the other hand, the amount of the conductive carbon material is more than 30 wt %, the conductive carbon material accounts for such a great proportion of the negative electrode composite layer that the negative electrode material and the binder resin are present in insufficient amounts. Thus, the negative electrode cannot achieve an adequate capacity or suffers a poor adhesion between the negative electrode collector and the negative electrode material. As a result, the lithium secondary battery is decreased in the charge/discharge cycle performance.

The amount of the binder resin present in the negative electrode composite layer is limited to the range of 5 to 40 wt % for the following reasons. If the amount of the binder resin is less than 5 wt %, the negative electrode suffers a decreased adhesion between the negative electrode collector and the negative electrode material so that the lithium secondary battery is decreased in the charge/discharge cycle performance. If, on the other hand, the amount of the binder resin is more than 40 wt %, the negative electrode is increased in resistance resulting in the decrease of the charge/discharge performance.

In the negative electrode for lithium secondary battery of the second aspect hereof, examples of a usable negative electrode material containing silicon include silicon and a silicon alloy.

Examples of a suitable silicon alloy include solid solutions, intermetallic compounds and eutectic alloys each composed of silicon and one or more other elements. Such a silicon alloy may be produced by, for example, an arc melting, melt quenching, mechanical alloying, sputtering, chemical vapor deposition, sintering or the like. The above melt quenching may include a single-roll quenching process, double-roll quenching process, and a variety of atomizing processes such as gas atomizing, water atomizing, disk atomizing and the like.

The usable negative electrode material may further include particles of silicon or silicon alloy which are surface-coated with a metal or the like. Examples of a method for surface-coating the particles of silicon or silicon alloy with a metal or the like include electroless plating, electrolytic plating, chemical reducing coating, vapor deposition, sputtering, chemical vapor deposition and the like. The particles of silicon or silicon alloy may preferably be coated with the same metal that forms the negative electrode collector. Specifically, if the particles of silicon or silicon alloy are surface-coated with the same metal that forms the negative electrode collector, the sintering may cause the negative electrode collector and the negative electrode material to be more tightly combined to each other and hence, an even more excellent charge/discharge cycle performance may be attained.

Besides the aforesaid silicon and silicon alloy, other usable negative electrode materials to be alloyed with lithium may include metals such as germanium, tin, lead, zinc, magnesium, sodium, aluminum, gallium and indium, and alloys thereof.

The above negative electrode materials are not particularly limited in particle size. However, in the light of an effective sintering and a favorable charge/discharge cycle performance, the negative electrode material may preferably have a mean particle size of not more than 100 μm, or more preferably of not more than 50 μm, or even more preferably of not more than 10 μm.

In the negative electrode for lithium secondary battery of the second aspect hereof, the above binder resin may be one that is not completely decomposed by the sintering in order that the improved adhesion between the particles of the negative electrode material or between the negative electrode material and the negative electrode collector may be attained when the sintering process is done, thereby contributing to the favorable charge/discharge cycle performance. Preferably employed binder resins include polyimide and fluorocarbon polymers. Polyimide having an excellent thermal stability is more preferred.

The preferred polyimide may be obtained by, for example, heat treating polyamic acid. In this case, polyamide acid is dehydrated/condensed by the heat treatment to form polyimide. The resultant polyimide may preferably have an imidation percentage of not less than 80% such that the adhesion between the negative electrode material and the negative electrode collector may be increased. It is noted that the imidation percentage means a mol % of the resultant polyimide based on the amount of polyamic acid. Polyimide having an imidation percentage of not less than 80% may be obtained by, for example, heat treating polyamide acid solution in N-methyl-2-pyrrolidone at temperatures of 100° C. to 400° C. for more than 1 hour.

The preferably employed fluorocarbon polymers include polyvinylidene fluoride, and polytetrafluoroethylene.

In the negative electrode for lithium secondary battery of the second aspect hereof, the negative electrode composite may be further admixed with a conductive metal material for further enhancing the current collecting performance. A mixing ratio of the conductive metal material is not more than 50 wt % based on the negative electrode material because an excessive amount of the conductive metal material leads to a reduced proportion of the negative electrode material present in the negative electrode composite.

The same material that forms the negative electrode collector and that is not alloyed with lithium may preferably be employed as the aforesaid conductive metal material. Specific examples of the usable conductive metal material include metals such as copper, nickel, iron, titanium, cobalt and the like, and alloys thereof. Among these, copper is particularly preferred.

Such a conductive metal material is not particularly limited in particle size. For increased current collecting performance, however, the material may preferably have a mean particle size of not more than 100 μm, or more preferably of not more than 50 μm or even more preferably of not more than 10 μm.

The following procedure may be taken, for example, to fabricate the negative electrode for lithium secondary battery of the second aspect hereof. Firstly, there is prepared a slurry of negative electrode composite including a negative electrode material containing silicon, a conductive carbon material, and a binder resin. The slurry is applied to a surface of a negative electrode collector and sintered in a non-oxidizing atmosphere such as an inert gas atmosphere such as of nitrogen, argon gas or the like, a hydrogen atmosphere and the like, thereby forming a layer of the negative electrode composite on the surface of the negative electrode collector.

A sintering temperature may preferably be at such a level as not to cause decomposition of the above binder resin. The sintering temperature is normally in the range of not more than 600° C., preferably of 200 to 500° C., or more preferably of 300 to 450° C. Examples of a suitable sintering method include plasma discharge sintering and hot press.

Preferably, after coated with the negative electrode composite including the negative electrode material containing silicon, the conductive carbon material and the binder resin, the negative electrode collector may be rolled prior to the sintering process. The rolling process increases the packing density of the negative electrode composite, thereby increasing the adhesion between the particles of the negative electrode material and between the negative electrode material and the negative electrode collector and contributing to the favorable charge/discharge cycle performance.

A lithium secondary battery according to the invention is characterized by the negative electrode for lithium secondary battery according to the first or second aspect thereof. That is, the lithium second battery of the invention is not particularly limited in the positive electrode or non-aqueous electrolyte and hence, may employ any of the known positive electrodes and non-aqueous electrolytes commonly used in the art.

In the inventive lithium secondary battery, any substance capable of electrochemically inserting or releasing lithium may be used as a positive electrode material for the positive electrode. Examples of a usable positive electrode material include lithium-containing transition metal oxides such as $LiCoO_2$, $LiNiO_2$, $LiMn_2O_4$, $LiMnO_2$, $LiCo_{0.5}Ni_{0.5}O_2$, $LiNi_{0.7}Co_{0.2}Mn_{0.1}O_2$ and the like; and lithium-free metal oxides such as $MnO_2$ and the like.

Examples of the usable non-aqueous electrolyte include a non-aqueous electrolytic solution comprising a solute dissolved in a non-aqueous solvent; a gel polymer electrolyte obtained by impregnating a polymer electrolyte, such as polyethylene oxide, polyacrylonitrile or the like, with the above non-aqueous electrolytic solution; and an inorganic solid electrolyte such as LiI, $Li_3N$ and the like.

Examples of a usable non-aqueous solvent for use in the non-aqueous electrolytic solution include ethylene carbonate, propylene carbonate, butylene carbonate, vinylene carbonate, cyclopentanone, sulfolane, dimethylsulfolane, 3-methyl-1,3-oxazolidine-2-one, γ-butyrolactone, dimethyl carbonate, diethyl carbonate, ethylmethyl carbonate, methylpropyl carbonate, butylmethyl carbonate, ethylpropyl carbonate, butylethyl carbonate, dipropyl carbonate, 1,2-dimethoxyethane, tetrahydrofuran, 2-methyl tetrahydrofuran, 1,3-dioxolane, methyl acetate, ethyl acetate and the like. These solvents may be used alone or in combination of two or more types.

Examples of the solute dissolved in the above non-aqueous solvent include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$ and the like. These solutes may be used alone or in combination of two or more types.

These and other objects, advantages and features of the invention will become apparent from the following description thereof taken in conjunction with the accompanying drawings which illustrate specific embodiments of the invention.

DESCRIPTION OF THE PREFERRED EMBODIMENTS

A negative electrode for lithium secondary battery and a lithium secondary battery according to the invention will hereinbelow be described in detail by way of examples thereof. In addition, comparative examples are also cited to clarify the advantages of the lithium secondary batteries employing the negative electrodes for lithium secondary battery according to the examples of the invention. It is to be noted that the negative electrode for lithium secondary battery and the lithium secondary battery according to the invention are not limited to the following examples and may be practiced with suitable modifications made thereon so long as such modifications do not deviate from the scope of the invention.

EXAMPLE A1

Figure 1:
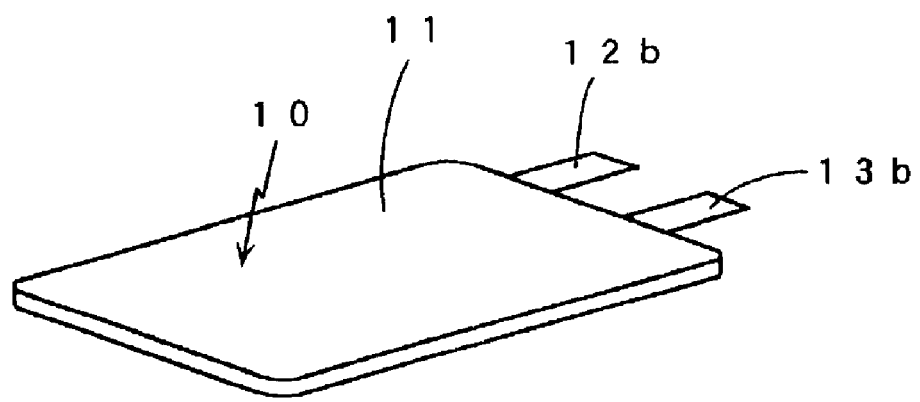
FIG. 1 is a schematic perspective view showing a lithium secondary battery fabricated in Example A1 and Comparative Example a1 of the invention.
Figure 2:
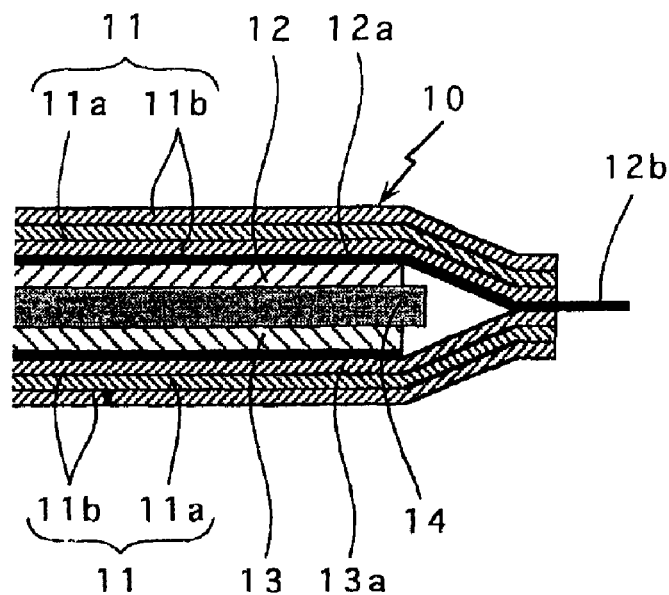
FIG. 2 is a group of sectional views each illustrating an internal construction of the lithium secondary battery fabricated in Example A1 and Comparative Example a1.
Figure 2:
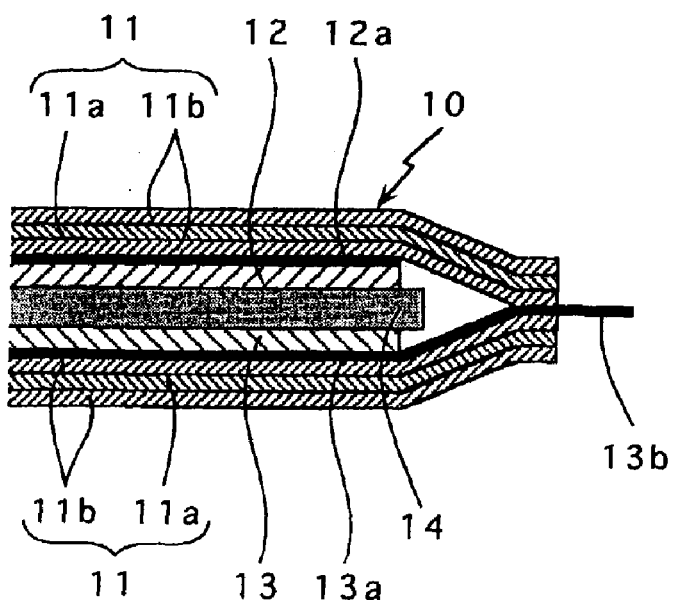

In Example A1, the following procedures were taken to prepare a negative electrode, positive electrode and non-aqueous electrolyte for fabrication of a thin lithium secondary battery as shown in FIGS. 1 and 2A–2B.

(Fabrication of Negative Electrode)

A negative electrode was fabricated as follows. A copper foil having a thickness of 35 µm, a proportional limit of 2.06 N/mm and an arithmetic mean surface roughness Ra of 1.0 µm was used as a negative electrode collector.

A silicon powder to be alloyed with lithium was used as a negative electrode material. A slurry was prepared by blending the silicon powder with polyvinylidene fluoride, as a binder resin, in a weight ratio of 9:1, and admixing the resultant mixture with N-methyl-2-pyrrolidone. The slurry was applied to one side of the negative electrode collector of copper foil using the doctor blade technique. The slurry was dried and then heat treated at 400° C. for 30 hours in a vacuum atmosphere. Subsequently, the copper foil with the slurry was cut into a size of 30 mm (widthwise dimension)× 25 mm (longitudinal dimension). Thus was fabricated the negative electrode having an overall thickness of 48 µm (the thickness of the negative electrode collector included).

(Fabrication of Positive Electrode)

A positive electrode was fabricated as follows. A slurry was prepared by blending together $LiCoO_2$ as a positive electrode material, graphite as a conductive material, and polyvinylidene fluoride as a binder resin in a weight ratio of 92.5:4.5:3, and admixing N-methyl-2-pyrrolidone with the resultant mixture.

The resultant slurry was doctor bladed onto one side of a positive electrode collector of an aluminum foil having a thickness of 20 µm and then dried. Subsequently, the aluminum foil with the slurry was cut into a size of 20 mm (widthwise dimension)×20 mm (longitudinal dimension) thereby giving the positive electrode having an overall thickness of 100 µm.

(Preparation of Non-Aqueous Electrolyte)

A non-aqueous electrolyte was prepared as follows. A non-aqueous solvent mixture was prepared by blending ethylene carbonate with diethyl carbonate in a volume ratio of 1:1. A solute of $LiPF_6$ was dissolved in the resultant solvent mixture in a concentration of 1 mol/l thereby to give the non-aqueous electrolyte.

(Fabrication of Battery)

A battery was fabricated as follows. As shown in FIGS. 2A and 2B, a battery case 10 was formed using a laminate film 11 comprising a metal sheet 11a of aluminum provided with a resin coat 11b of polypropylene on the both sides thereof. A separator 14 of a microporous polyethylene film was interposed between the positive electrode 12 and the negative electrode 13 fabricated in the aforementioned manners. The positive and negative electrodes with the separator were accommodated in the case 10. Then, the battery case 10 was filled with the aforementioned non-aqueous electrolyte.

A positive electrode terminal 12b defined by an extension of a positive electrode collector 12a of the positive electrode 12 was led out of the battery case 10, while a negative electrode terminal 13b defined by an extension of a negative electrode collector 13a of the negative electrode 13 was led out of the case 10. In this state, the battery case 10 was heat sealed to form a thin lithium battery as shown in FIG. 1.

COMPARATIVE EXAMPLE a1

Comparative Example a1 took the same procedure as Example A1 to fabricate a negative electrode having a widthwise dimension of 30 mm, a longitudinal dimension of 25 mm and an overall thickness of 30 µm (inclusive of the thickness of the negative electrode collector), except that a copper foil having a thickness of 18 µm, a proportional limit of 1.08 N/mm and an arithmetic mean surface roughness Ra of 0.5 µm was used.

A thin lithium secondary battery as shown in FIG. 1 was fabricated the same way as in Example A1, except that the negative electrode thus fabricated was used.

Figure 3:
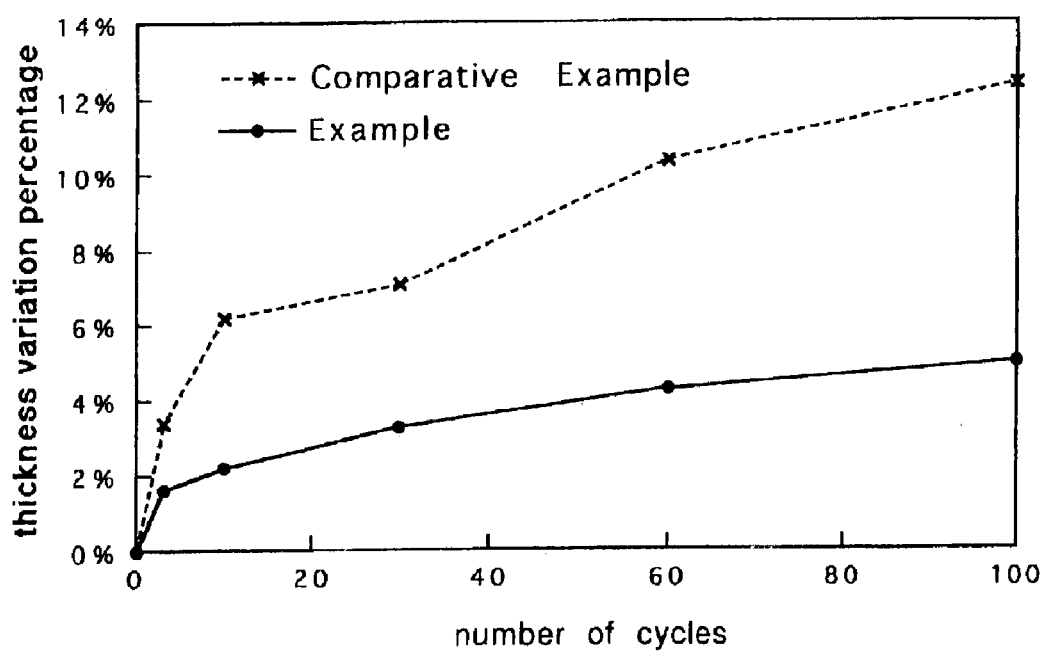
FIG. 3 is a graph representing a relation between the number of cycles and the thickness variation percentage of the lithium secondary battery of Example A1 or Comparative Example a1 subjected to charging/discharging processes.

In one cycle, the lithium secondary batteries of Example A1 and Comparative Example a1 thus fabricated were each charged at a constant current of 14 mA to 4.2 V and then discharged at a constant current of 14 mA to 2.75 V. Such charging and discharging were repeated in cycles while each of the lithium secondary batteries was determined for an initial thickness 'to' thereof and a thickness 'ta' thereof at each cycle. The determined values were applied to the following equation to find a thickness variation percentage (%) at each cycle. The results are shown in FIG. 3, where a solid line represents the results of the lithium secondary battery of Example A1 whereas a broken line represents the results of the lithium secondary battery of Comparative Example a1. Thickness variation percentage (%)=(ta−to)× 100/to As apparent from the results, the lithium secondary battery of Example A1 employing the negative electrode collector having the proportional limit of not less than 2.0 N/mm has smaller thickness variations associated with charge/discharge as compared with the battery of Comparative Example a1 employing the negative electrode collector having the proportional limit of less than 2.0 N/mm. After the above charge/discharge test, the lithium secondary batteries were disassembled and examined. No wrinkle was observed on the negative electrode of the lithium secondary battery of Example A1, whereas wrinkles were observed on the negative electrode of the battery of Comparative Example a1.

The lithium secondary batteries of Example A1 and Comparative Example a1 were each charged and discharged in cycles, each cycle consisting of charging at a constant current of 14 mA to 4.2 V and discharging at a constant current of 14 mA to 2.75 V. The batteries were each determined for an initial discharge capacity 'Qo' and a discharge capacity 'Qa' at each cycle. The determined values were applied to the following equation to find a capacity retention percentage (%) at each cycle. The results are listed in Table 1 as below. Capacity retention percentage (%)=Qa× 100/Qo powder and Ketchen black were blended with a polyamic acid solution in N-methyl-2-pyrrolidone to give the negative electrode composite slurry.

The resultant slurry was applied to one side of the negative electrode collector of copper foil using the doctor blade technique and then dried. The negative electrode collector wherein a layer of negative electrode composite was rolled and cut into a disk shape having a diameter of 20 mm. Subsequently, the disk was sintered at 400° C. for 30 hours in an argon atmosphere thereby to form the negative electrode wherein a layer of the negative electrode composite was formed on one side the negative electrode collector. In the resultant negative electrode, the negative electrode composite layer had a thickness X of 15 μm so that a ratio of the thickness X of the negative electrode composite layer versus the arithmetic mean surface roughness Ra of the negative electrode collector (=X/Ra) was at 30.

In the negative electrode, polyimide, as the binder resin, was produced from polyamic acid by the sintering. The negative electrode composite layer contained therein polyimide in a concentration of 18.2 wt % and Ketchen black as the conductive carbon material in a concentration of 1.6 wt %.

(Fabrication of Positive Electrode)

A positive electrode was fabricated as follows. $Li_2CO_3$ and $CoCO_3$, as a positive electrode material, were weighed out in a Li—Co atomic ratio of 1:1 and were blended together in a mortar. The resultant mixture was press formed in a mold having a diameter of 17 mm and sintered in the air at 800° C. for 24 hours. Subsequently, the resultant mold

TABLE 1

| | Capacity retention percentage | | | | | | | | | |
|---|---|---|---|---|---|---|---|---|---|---|
| Number of cycles | 10 | 20 | 30 | 40 | 50 | 60 | 70 | 80 | 90 | 100 |
| Example A1 | 90.9 | 83.3 | 76.1 | 67.3 | 56.1 | 44.7 | 33.7 | 24.2 | 16.0 | 16.0 |
| Comparative example a1 | 86.5 | 79.3 | 71.1 | 59.1 | 46.1 | 31.2 | 18.2 | 11.4 | 7.2 | 5.8 |

As apparent from the results, the lithium secondary battery of Example A1 employing the negative electrode collector having the proportional limit of not less than 2.0 N/mm is more improved in the capacity retention percentage as compared with the battery of Comparative Example a1 employing the negative electrode collector having the proportional limit of less than 2.0 N/mm.

EXAMPLE B1

Figure 4:
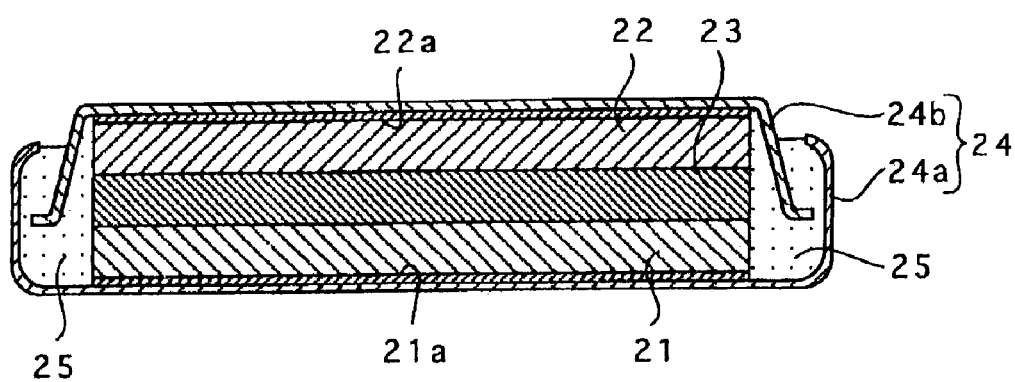
FIG. 4 is a schematic sectional view showing an internal construction of a lithium secondary battery fabricated in Examples B1 to B17 and Comparative Examples b1 to b5 of the invention.

In Example B1, the following procedures were taken to prepare a negative electrode, positive electrode and non-aqueous electrolyte for fabrication of a flat coin-type lithium secondary battery as shown in FIG. 4.

(Fabrication of Negative Electrode)

A negative electrode was fabricated as follows. A copper foil having a thickness of 35 μm and an arithmetic mean surface roughness Ra of 0.5 μm was used as the negative electrode collector.

A negative electrode composite slurry was prepared as follows. A silicon powder having a mean particle size of 3 μm was used as a negative electrode material, whereas Ketchen black having a mean particle size of 0.3 μm was used as a conductive carbon material. Polyamic acid was employed for forming polyimide as a binder resin. The silicon powder, Ketchen black and polyamic acid were weighed out in a weight ratio of 8.6:1.57:19.8. The silicon was pulverized in a mortar to give $LiCoO_2$ powder having a mean particle size of 20 μm.

The $LiCoO_2$ powder, a synthesized graphite powder as a conductive material, and polyvinylidene fluoride as a binder resin were weighed out in a weight ratio of 90:5:5. The weighed-out $LiCoO_2$ powder and synthesized graphite powder were blended with a polyvinylidene fluoride solution in N-methyl-2-pyrrolidone to give a positive electrode composite slurry. The resultant slurry was applied to a positive electrode collector of aluminum foil and dried. Subsequently, the aluminum foil collector with the layer of negative electrode composite was rolled and cut into a disk shape having a diameter of 20 mm. Thus was fabricated the positive electrode.

(Preparation of Non-Aqueous Electrolyte)

A non-aqueous electrolyte was prepared as follows. A non-aqueous solvent mixture was prepared by blending ethylene carbonate with diethyl carbonate in a volume ratio of 1:1. A solute of $LiPF_6$ was dissolved in the solvent mixture in a concentration of 1 mol/l.

(Fabrication of Battery)

A battery was fabricated as follows. As shown in FIG. 4, a separator 23 impregnated with the non-aqueous electrolyte was interposed between the positive electrode 21 and the negative electrode 22 fabricated in the aforementioned manner. The positive and negative electrodes with the separator interposed therebetween were accommodated in a battery case 24 consisting of a positive electrode case 24a and a negative electrode case 24b. The positive electrode 21 was connected with the positive electrode case 24a via a positive electrode collector 21a, whereas the negative electrode 22 was connected with the negative electrode case 24b via a negative electrode collector 22a. The positive electrode case 24a was electrically isolated from the negative electrode case 24b by means of an insulation packing 25. Thus was fabricated a flat coin-type lithium secondary battery.

EXAMPLE B2

In Example B2, a negative electrode was fabricated the same way as in Example B1, except that a copper foil having a thickness of 35 μm and an arithmetic mean surface roughness Ra of 0.2 μm was used as the negative electrode collector. In this negative electrode, a ratio of the thickness X of the negative electrode composite layer versus the arithmetic mean surface roughness Ra of the negative electrode collector (=X/Ra) was at 75.

A lithium secondary battery of Example B2 was fabricated the same way as in Example B1, except that the negative electrode thus fabricated was used.

EXAMPLE B3

In Example B3, a negative electrode was fabricated the same way as in Example B1, except that although the same negative electrode collector as that of Example B1 was used, the negative electrode composite further contained therein a silver powder having a mean particle size of 0.5 μm, as a conductive metal material, in an amount of 10 wt % based on the silicon powder.

A lithium secondary battery of Example B3 was fabricated the same way as in Example B1, except that the negative electrode thus fabricated was used.

EXAMPLE B4

In Example B4, a negative electrode was fabricated the same way as in Example B1, except that although the same negative electrode collector as that of Example B1 was used, the negative electrode composite contained polyvinylidene fluoride in place of polyimide as the binder resin.

A lithium secondary battery of Example B4 was fabricated the same way as in Example B1, except that the negative electrode thus fabricated was used.

EXAMPLE B5

In Example B5, a negative electrode was fabricated the same way as in Example B1, except that although the same negative electrode collector as that of Example B1 was used, the negative electrode composite layer was formed on the negative electrode collector in a thickness X of 50 μm. In the resultant negative electrode, a ratio of the thickness X of the negative electrode composite layer versus the arithmetic mean surface roughness Ra of the negative electrode collector (=X/Ra) was at 100.

A lithium secondary battery of Example B5 was fabricated the same way as in Example B1, except that the negative electrode thus fabricated was used.

COMPARATIVE EXAMPLE b1

In Comparative Example b1, a negative electrode was fabricated the same way as in Example B1, except that a copper foil having a thickness of 35 μm and an arithmetic mean surface roughness Ra of 0.1 μm was used as the negative electrode collector. In the resultant negative electrode, a ratio of the thickness X of the negative electrode composite layer versus the arithmetic mean surface roughness Ra of the negative electrode collector (=X/Ra) was at 150.

A lithium secondary battery of Comparative Example b1 was fabricated the same way as in Example B1, except that the negative electrode thus fabricated was used.

COMPARATIVE EXAMPLE b2

In Comparative Example b2, a negative electrode was fabricated the same way as in Example B1, except that a copper foil having a thickness of 35 μm and an arithmetic mean surface roughness Ra of 0.2 μm was used as the negative electrode collector and that the negative electrode composite layer was formed on the negative electrode collector in a thickness X of 55 μm. In the resultant negative electrode, a ratio of the thickness X of the negative electrode composite layer versus the arithmetic mean surface roughness Ra of the negative electrode collector (=X/Ra) was at 275.

A lithium secondary battery of Comparative Example b2 was fabricated the same way as in Example B1, except that the negative electrode thus fabricated was used.

In one cycle, the lithium secondary batteries of Examples B1 to B5 and Comparative Examples b1 and b2 thus fabricated were each charged at a current of 1 mA to 4.2 V and then discharged at a current of 1 mA to 2.7 V. Each of the batteries was charged and discharged in cycles to determine a number of cycles until a discharge capacity drops to 80% of that at the first cycle, whereby a cycle life of each battery was determined. The results are listed in Table 2 as below. It is noted that the cycle life of each lithium secondary battery is represented by an index based on the cycle life of Example B1 defined as 100.

TABLE 2

| | Ra (μm) | X (μm) | X/Ra | Binder resin | Cycle life |
|---|---|---|---|---|---|
| Example B1 | 0.5 | 15 | 30 | polyimide | 100 |
| Example B2 | 0.2 | 15 | 75 | polyimide | 80 |
| Example B3 | 0.5 | 15 | 30 | polyimide | 103 |
| Example B4 | 0.5 | 15 | 30 | polyvinylidene fluoride | 82 |
| Example B5 | 0.5 | 50 | 100 | polyimide | 55 |
| Comparative Example b1 | 0.1 | 15 | 150 | polyimide | 21 |
| Comparative Example b2 | 0.2 | 55 | 275 | polyimide | 14 |

As apparent from the results, a notable improvement in the cycle life is achieved by the lithium secondary batteries of Examples B1 to B5 employing the negative electrode collector having the arithmetic mean surface roughness Ra of not less than 0.2 μm and having the ratio of the thickness X of the negative electrode composite layer versus the arithmetic mean surface roughness Ra thereof (=X/Ra) in the range of not more than 250, as compared with that of Comparative Example b1 employing the negative electrode collector having the arithmetic mean surface roughness Ra of less than 0.2 μm or that of Comparative Example b2 having the ratio of the thickness X of the negative electrode composite layer versus the arithmetic mean surface roughness Ra of the negative electrode collector (=X/Ra) in excess of 250. This demonstrates that if the negative electrode collector has the arithmetic mean surface roughness Ra of not less than 0.2 μm and the ratio between the arithmetic mean surface roughness Ra and the thickness X of the negative electrode composite layer formed on the surface of the negative electrode collector by sintering satisfies 250≧X/Ra, an increased contact area is attained between the negative electrode material and the negative electrode collector so that the sintering process is allowed to achieve a significantly increased adhesion between the negative electrode collector and the negative electrode material.

According to a comparison between the lithium secondary battery of Example B1 with those of Examples B2 to B5, the battery of Example B1 has a greater cycle life than the battery of Example B2 employing the negative electrode collector having a smaller arithmetic mean surface roughness Ra, that of Example B4 employing the negative electrode composite containing polyvinylidene fluoride in place of polyimide as the binder resin or that of Example B5 having a greater value of X/Ra resulting from the increased thickness X of the negative electrode composite layer. On the other hand, the lithium secondary battery of Example B3 employing the negative electrode composite containing the additional silver powder as the conductive metal material is even more improved in the cycle life than that of Example B1. As to the battery of Example B4 employing the negative electrode composite containing polyvinylidene fluoride in place of polyimide as the binder resin, it is thought that the decreased cycle life is associated with the sintering process reducing the amount of the binder resin by decomposing some of polyvinylidene fluoride.

EXAMPLES B6 TO B15 AND COMPARATIVE EXAMPLE b3

In Examples B6 to B15 and Comparative Example b3, each negative electrode was fabricated the same way as in Example B1, except that although the same negative electrode collector as that of Example B1 was used, a weight ratio of polyimide and Ketchen black present in the negative electrode composite layer formed by sintering was varied as listed in Table 3 as below by changing the amount of Ketchen black as the conductive carbon material and the amount of polyamic acid for forming polyimide as the binder resin, constituting the negative electrode composite.

Except for this, the same procedure as in Example B1 was taken to fabricate the individual negative electrodes, which were used to fabricate lithium secondary batteries of Examples B6 to B15 and Comparative Example b3.

The batteries of Examples B6 to B15 and Comparative Example b3 thus fabricated were tested the same way as in Example B1. That is, each of the batteries of Examples B6 to B15 and Comparative Example b3 was determined for a number of cycles to reach 80% of the discharge capacity at the first cycle, so that a cycle life thereof was determined in terms of an index based on the cycle life of Example B1 defined as 100. The results are listed in Table 3.

TABLE 3

| | Mixing ratios in negative electrode composite (wt %) | | |
| --- | --- | --- | --- |
| | Polyimide | Ketchen black | Cycle life |
| Example B1 | 18.2 | 1.6 | 100 |
| Example B6 | 18.2 | 4.1 | 96 |
| Example B7 | 18.2 | 7.3 | 92 |
| Example B8 | 18.2 | 16.4 | 82 |
| Example B9 | 10.0 | 0.9 | 92 |

TABLE 3-continued

| | Mixing ratios in negative electrode composite (wt %) | | |
| --- | --- | --- | --- |
| | Polyimide | Ketchen black | Cycle life |
| Example B10 | 10.0 | 4.5 | 86 |
| Example B11 | 10.0 | 18.0 | 49 |
| Example B12 | 25.0 | 1.5 | 99 |
| Example B13 | 25.0 | 3.75 | 93 |
| Example B14 | 25.0 | 15.0 | 94 |
| Example B15 | 30.8 | 3.5 | 84 |
| Comparative Example b3 | 18.2 | 30.7 | 23 |

The results indicate that where the amount of Ketchen black is not less than 1 wt %, the cycle life tends to decrease with increase in the amount of Ketchen black present in the negative electrode composite layer formed on the surface of the negative electrode collector. The lithium secondary batteries of Examples B6 to B15 containing the conductive carbon material in concentrations of 0.5 to 30 wt % and the binder resin in concentrations of 5 to 40 wt % are notably improved in the cycle life as compared with the battery of Comparative Example b3 containing the conductive carbon material in a concentration of above 30 wt %.

EXAMPLE B16

In Example B16, a negative electrode was fabricated the same way as in Example B1, except that the negative electrode collector with the negative electrode composite slurry applied to one side thereof was sintered at 700° C. for 10 hours in an argon atmosphere. The resultant negative electrode was used to fabricate a lithium secondary battery of Example B16.

COMPARATIVE EXAMPLE b4

In Comparative Example b4, a negative electrode was fabricated the same way as in Example B1, except that the sintering of the negative electrode collector with the negative electrode composite slurry applied to one side thereof was dispensed with. The resultant negative electrode was used to fabricate a lithium secondary battery of Comparative Example b4.

The batteries of Examples B16 and Comparative Example b4 thus fabricated were tested the same way as in Example B1. That is, each of the batteries was determined for a number of cycles to reach 80% of the discharge capacity at the first cycle, so that a cycle life thereof was determined in terms of an index based on the cycle life of Example B1 defined as 100. The results are listed in Table 4.

TABLE 4

| | Sintering temperature and time | | Cycle life |
| --- | --- | --- | --- |
| Example B1 | 400° C. | 30 hours | 100 |
| Example B16 | 700° C. | 10 hours | 40 |
| Comparative example b4 | no | | 20 |

As apparent from the results, a significant improvement in the cycle life is achieved by the lithium secondary batteries of Examples B1 and B16 employing the negative electrode formed by sintering the negative electrode composite slurry on one side of the negative electrode collector in the non-oxidizing atmosphere, as compared with the battery of Comparative Example b4 employing the negative electrode formed by just applying the negative electrode composite slurry on one side of the negative electrode collector. This is because the sintering process not only remarkably improves the adhesion between the negative electrode collector and the negative electrode material but also diffuses some of the copper constituting the negative electrode collector in the negative electrode composite so as to allow the negative electrode collector to retain the negative electrode material in an adequate contact therewith in spite of the expansion or contraction of the negative electrode material associated with the charging or discharging process.

According to a comparison between the lithium secondary batteries of Examples B1 and B16, the battery of Example B16 has a much smaller cycle life. This is because the sintering at such a high temperature of 700° C. decomposes most of the binder resin of polyimide contained in the negative electrode composite, so that a binding effect is not provided any more.

EXAMPLE B17

In Example B17, a negative electrode was fabricated the same way as in Example B1, except that although the negative electrode collector comprised the copper foil of Example B1 having the arithmetic mean surface roughness Ra of 0.5 µm, the negative electrode material comprised a silicon powder having a mean particle size of 75 µm in place of the silicon powder having the mean particle size of 3 µm. The resultant negative electrode was used to fabricate a lithium secondary battery of Example B17.

COMPARATIVE EXAMPLE b5

In Comparative Example b5, a negative electrode was fabricated the same way as in Example B1, except that the negative electrode collector comprised the copper foil of Comparative Example b1 having the arithmetic mean surface roughness Ra of 0.1 µm and that the negative electrode material comprised the silicon powder of Example B17 having the mean particle size of 75 µm. The resultant negative electrode was used to fabricate a lithium secondary battery of Comparative Example b5.

The batteries of Example B17 and Comparative Example b5 thus fabricated were tested the same way as in Example B1. That is, each of the batteries was determined for a number of cycles to reach 80% of the discharge capacity at the first cycle, so that a cycle life thereof was determined in terms of an index based on the cycle life of Example B1 defined as 100. The results are listed in Table 5.

TABLE 5

| | Ra (µm) | X/Ra | Mean particle size of silicon powder (µm) | Cycle life |
|---|---|---|---|---|
| Example B1 | 0.5 | 30 | 3 | 100 |
| Example B17 | 0.5 | 30 | 75 | 25 |
| Comparative Example b5 | 0.1 | 150 | 75 | 16 |

As apparent from the results, the lithium secondary battery of Example B17 employing the negative electrode collector having the arithmetic mean surface roughness Ra of not less than 0.2 µm has a greater cycle life than that of Comparative Example b5 having the arithmetic mean surface roughness Ra of less than 0.2 µm. However, the battery of Example B17 is significantly decreased in the cycle life as compared with that of Example B1 employing the negative electrode material containing the silicon powder having the mean particle size of 3 µm.

Although the present invention has been fully described by way of examples, it is to be noted that various changes and modifications will be apparent to those skilled in the art.

Therefore, unless otherwise such changes and modifications depart from the scope of the present invention, they should be construed as being included therein.

What is claimed is:

1. A negative electrode for lithium secondary battery comprising a negative electrode composite including a negative electrode material including a material to be alloyed with lithium and a binder resin, and a negative electrode collector having the negative electrode composite attached thereon, wherein
   the negative electrode collector has a proportional limit of not less than 2.0 N/mm, wherein
   the negative electrode collector has an arithmetic mean roughness Ra of not less than 0.2 µm at the surface formed with the negative electrode composite layer, and wherein
   the arithmetic mean surface roughness Ra of the negative electrode collector and a thickness X (µm) of the negative electrode composite layer satisfy a condition of $250 \geq X/Ra$.

2. The negative electrode for lithium secondary battery as claimed in claim 1, wherein the negative electrode collector comprises copper or a copper alloy.

3. A lithium secondary battery comprising the negative electrode for lithium secondary battery as claimed in claim 1.

4. A negative electrode for lithium secondary battery comprising a negative electrode composite including a negative electrode material containing silicon, a conductive carbon material and a binder resin, and a negative electrode collector having the negative electrode composite attached to a surface thereof and sintered in a non-oxidizing atmosphere to form thereon a layer of the negative electrode composite, wherein
   the negative electrode collector has an arithmetic mean roughness Ra of not less than 0.2 µm at the surface formed with the negative electrode composite layer, wherein
   the arithmetic mean surface roughness Ra of the negative electrode collector and a thickness X (µm) of the negative electrode composite layer satisfy a condition of $250 \geq X/Ra$, and wherein
   the negative electrode composite layer contains therein the conductive carbon material in concentrations of 0.5 to 30 wt % and the binder resin in concentrations of 5 to 40 wt %.

5. The negative electrode for lithium secondary battery as claimed in claim 4, wherein a value of the expression X/Ra is not more than 100.

6. The negative electrode for lithium secondary battery as claimed in claim 4, wherein the negative electrode composite layer contains therein the conductive carbon material in concentrations of 0.9 to 18 wt %.

7. The negative electrode for lithium secondary battery as claimed in claim 4, wherein the conductive carbon material contained in the negative electrode composite layer is Ketchen black.

8. The negative electrode for lithium secondary battery as claimed in claim 4, wherein the negative electrode composite further contains a conductive metal material.

9. The negative electrode for lithium secondary battery as claimed in claim 4, wherein at least a surface of the negative electrode collector is formed of copper or a copper alloy.

10. The negative electrode for lithium secondary battery as claimed in claim 4, wherein at least a surface of the negative electrode collector is formed of a foil of copper or copper alloy electrolytically deposited.

11. The negative electrode for lithium secondary battery as claimed in claim 4, wherein the binder resin contains polyimide.

12. The negative electrode for lithium secondary battery as claimed in claim 4, wherein the negative electrode material containing silicon has a mean particle size of not more than 75 μm.

13. The negative electrode for lithium secondary battery as claimed in claim 4, wherein the negative electrode material containing silicon has a mean particle size of not more than 10 μm.

14. The negative electrode for lithium secondary battery as claimed in claim 4, wherein the negative electrode collector has an arithmetic mean surface roughness Ra of not less than 0.5 μm.

15. A lithium secondary battery comprising the negative electrode for lithium secondary battery as claimed in claim 4.

* * * * *